US009486968B2

(12) United States Patent
Anderson et al.

(10) Patent No.: US 9,486,968 B2
(45) Date of Patent: Nov. 8, 2016

(54) SURFACE COVERING WITH STATIC CONTROL PROPERTIES

(75) Inventors: Tommy Anderson, Ronneby (SE); Roland Karlsson, Listerby (SE); Anders Stokki, Ronneby (SE); Cecilia Melin, Ronneby (SE); Kristin Lindström, Ronneby (SE)

(73) Assignee: Tarkett France, Nanterre Cedex (FR)

( * ) Notice: Subject to any disclaimer, the term of this patent is extended or adjusted under 35 U.S.C. 154(b) by 1535 days.

(21) Appl. No.: 13/058,460

(22) PCT Filed: Aug. 3, 2009

(86) PCT No.: PCT/EP2009/060015
§ 371 (c)(1),
(2), (4) Date: Apr. 27, 2011

(87) PCT Pub. No.: WO2010/018094
PCT Pub. Date: Feb. 18, 2010

(65) Prior Publication Data
US 2011/0193029 A1      Aug. 11, 2011

(30) Foreign Application Priority Data

Aug. 14, 2008   (EP) .................................. 08162377

(51) Int. Cl.
| | |
|---|---|
| *B29C 43/00* | (2006.01) |
| *B29C 70/88* | (2006.01) |
| *H05F 3/00* | (2006.01) |
| *E04F 15/02* | (2006.01) |
| *B29C 43/22* | (2006.01) |
| *H05F 3/02* | (2006.01) |
| *B29C 43/30* | (2006.01) |
| *B29C 43/34* | (2006.01) |
| *B29C 43/48* | (2006.01) |
| *B29K 303/06* | (2006.01) |

(52) U.S. Cl.
CPC .......... *B29C 70/882* (2013.01); *B29C 43/003* (2013.01); *B29C 43/22* (2013.01); *H05F 3/025* (2013.01); *B29C 43/30* (2013.01); *B29C 2043/3433* (2013.01); *B29C 2043/483* (2013.01); *B29K 2303/06* (2013.01); *B29K 2995/0005* (2013.01); *E04F 15/02* (2013.01); *E04F 2290/048* (2013.01)

(58) Field of Classification Search
None
See application file for complete search history.

(56) References Cited

U.S. PATENT DOCUMENTS

| | | | |
|---|---|---|---|
| 2,729,770 A | 1/1956 | Robbins | |
| 3,038,828 A * | 6/1962 | Yakubik ............... | B29C 43/006 156/297 |
| 3,267,187 A * | 8/1966 | Slosberg et al. .............. | 264/122 |
| 4,396,566 A | 8/1983 | Brinkmann et al. | |
| 5,059,471 A * | 10/1991 | McNally et al. ............. | 428/143 |
| 6,379,589 B1 * | 4/2002 | Aldissi .......................... | 252/500 |
| 6,524,742 B1 * | 2/2003 | Emanuel et al. ............. | 429/129 |
| 2002/0168500 A1 * | 11/2002 | Graab ..................... | B29C 43/30 428/143 |

FOREIGN PATENT DOCUMENTS

| | | | | |
|---|---|---|---|---|
| DE | 4212950 A1 | 10/1993 | | |
| EP | 1544258 A1 | 6/2005 | | |
| JP | 07041705 | * 2/1995 | ............... | C09D 5/24 |
| JP | 2005097512 A | * 4/2005 | ............... | C08K 7/24 |

OTHER PUBLICATIONS

Finesse EC/Finesse Static Conductive, "Polyflor Static Control Range", data sheet issued in Oct. 1994, 1 page.
Polyflor Finesse Static Control, "Finesse Static Conductive", data and sample sheet from Jul. 1998, 1 page.
Polyflor Covering the World, "Product Constituents, Finesse Electrostatic Conductive", record of a formulation from Jul. 1, 2000, prepared for external distribution with the product or a precursor thereto, 1 page.
Polyflor ESD, Finesse EC, "Product Specification", Sep. 2006, 1 page.
Polyflor ESD, Finesse EC, "Performance and Properties", Jan. 2007, 1 page.

* cited by examiner

*Primary Examiner* — Tanisha Diggs
(74) *Attorney, Agent, or Firm* — Reinhart Boerner Van Deuren P.C.

(57) ABSTRACT

The present invention relates to a substrate-free conductive surface covering, and a process to manufacture such covering, said surface covering comprising a core layer of sheet particles which are agglomerated and embedded in a polymer matrix, wherein the particles or the polymer matrix, or both, comprise an electrically conductive material.

30 Claims, 5 Drawing Sheets

SURFACE COVERING WITH STATIC CONTROL PROPERTIES

SUBJECT OF THE INVENTION

The present invention relates to a substrate-free surface covering having static control properties and a process to manufacture such surface covering.

PRIOR ART

Surface coverings such as multiple-layer coverings and substrate-free coverings are well known by those skilled in the art.

Decorative multiple layers coverings are heterogeneous coverings and multilayer composites, comprising generally a backing layer, usually called "substrate", and different layers made of distinctive and different composition, commonly, PVC-based or polyolefin-based layers. Generally, the substrate is a non-woven or woven fabric, felt, rubber, compact or foamable resin-based layer.

Substrate-free surface coverings (also called "homogeneous" coverings) are coverings which do not comprise a backing layer (or substrate). Such coverings comprise a single layer (core layer) of polymer particles and are produced by agglomerating these particles using heat and pressure, in a double belt press device for instance, enabling the particles to fuse together to form a homogeneous sheet.

An example of a process to produce substrate-free surface covering is described in U.S. Pat. No. 4,396,566, in which thermoplastic synthetic resin particles are applied to a moving support, passed through a heating zone, compacted and welded under pressure, and then cooled simultaneously under pressure.

Substrate-free surface coverings present the drawback to have poor static control properties. Generally, they are insulators. For this reason, these surface coverings are not suitable for an electrostatic-free environment needed in some industries which manufacture and/or store electronics equipments, especially in electronic manufacturing industries.

Therefore, surface coverings having static dissipative electric properties have been developed. For example, GB 2 207 435 discloses a surface covering comprising a consolidated agglomeration of individual chips of polymeric material, wherein at least some of the individual chips contain an antistatic agent.

Furthermore, to increase the cleaning and maintenance properties of homogeneous surface coverings, it is well known that a varnish layer may be applied on the top surface of the coverings. However, such varnish layer has electrical insulation properties.

AIMS OF THE INVENTION

The present invention provides a substrate-free surface covering and a process to manufacture such covering that does not have the drawbacks of the prior art.

It provides in particular a substrate-free surface covering having static control properties.

It provides in particular a substrate-free surface covering having dissipative or conductive properties.

The present invention provides also a process to manufacture a substrate-free surface covering having static control properties.

SUMMARY OF THE INVENTION

The present invention describes a substrate-free conductive surface covering comprising a core layer of particles obtained by shredding a sheet, said particles being unfused and embedded in a polymer matrix wherein said particles or said polymer matrix, or both comprises an electrically conductive material.

A "substrate-free" surface covering is a surface covering which do not comprise a backing layer (or substrate) on which the particles, component of the surface covering, are poured onto before agglomeration.

According to particular embodiments, the substrate-free conductive surface covering comprises one or a suitable combination of any of the following characteristics:
- the core layer is covered on the top side by a polyurethane-based varnish, said varnish comprising metal coated spherical particles;
- a conductive primer layer is present between the polyurethane varnish top coating and the core layer of shredded sheet particles;
- the electrically conductive material is selected from the group consisting of metal, metal oxide, a metal alloy, carbon, or a mixture thereof;
- the electrically conductive material is selected from the group consisting of silver, nickel, tungsten, aluminium, copper, gold, stainless steel, titanium, titanium dioxide, tin, tin oxide, antimony, antimony oxide, carbon black, carbon graphite, carbon nanotubes, or a mixture thereof;
- the electrically conductive material is an acicular tin oxide composition;
- the polymer matrix represents less than 50 wt % of the total weight of the composition of said substrate-free conductive surface covering;
- the sheet particles and/or the polymer matrix are PVC-based or polyolefin-based;
- the substrate-free conductive surface covering comprises a conductive coating on the back side of said surface covering;
- the substrate-free conductive surface covering has a conductive resistance less than $1 \times 10^{11}$ Ohm;
- the substrate-free conductive surface covering has a conductive resistance less than $1 \times 10^{9}$ Ohm;

The present invention describes also a process to manufacture a substrate-free conductive surface covering, said process comprising the steps of:
- a) providing particles obtained by shredding a sheet,
- b) providing a polymer-based powder for the polymer matrix,
- c) depositing said particles on a band-shaped moving carrier,
- d) depositing the polymer-based powder on said particles,
- e) heat treating the particles and the polymer-based powder and compacting them in a press to form agglomerated and unfused particles (10,11) embedded in the polymer matrix (12,14), wherein said particles, or said polymer matrix, or both, comprises an electrically conductive material.

According to particular embodiments, the process may comprise one or a suitable combination of any of the following characteristics:
- the process comprises a step of sanding the back side surface of the resulting conductive surface covering to a predefined thickness;
- the dust generated in the back side sanding step is deposited on the band-shaped moving carrier before step c);
- the process comprises a step of coating the back side of the surface covering with a conductive coating;

the process comprises a step of coating the top side of the surface covering with a polyurethane-based composition comprising metal coated spherical particles;

a conductive primer is applied onto the top surface of the conductive surface covering before applying the polyurethane-based varnish.

DETAILED DESCRIPTION OF THE INVENTION

Figure 1:
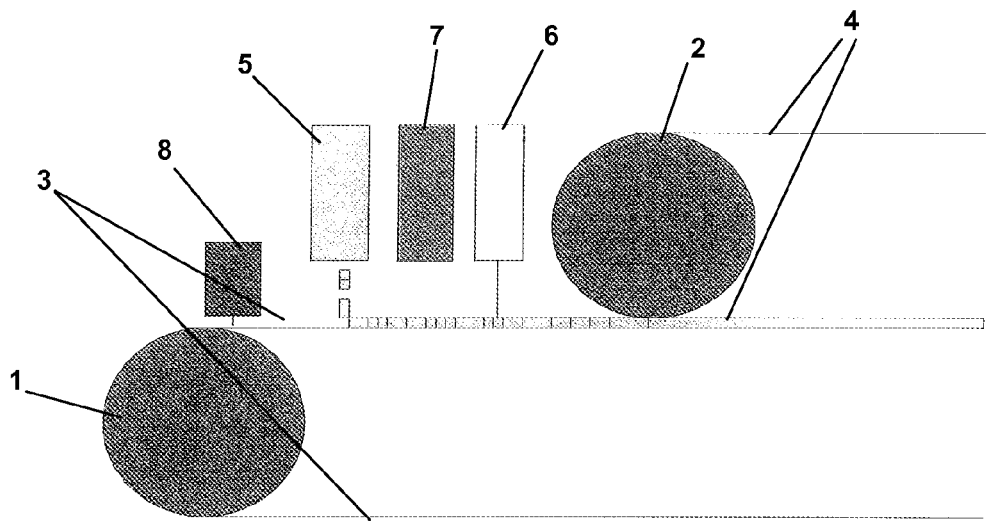
FIG. 1 is a schematic representation of a double belt press device to manufacture a substrate-free surface covering according to a first embodiment of the invention.

A decorative surface covering, in particular a floor covering, presents specific mechanical properties, particularly in terms of mechanical resistance, wear and indentation resistance, but also in terms of comfort, softness, sound and heat insulation.

The substrate-free conductive surface covering of the present invention combines the mechanical properties of such substrate-free surface covering with static control properties, and thus may be considered as a "static control" surface covering as it can reduce, or suppress, static charge generation and drains charges to ground.

The conductive substrate-free surface covering according to the present invention comprises unfused conductive particles 10 and/or unfused non-conductive particles 11 embedded in a polymer matrix 12 or 14, said polymer matrix may, or may not, comprise a conductive material which improve the electrical conductivity of said surface covering.

The non-conductive or conductive particles are polymer particles, preferably made of rubber-based, PVC-based or Polyolefin-based materials. They may have a form of a granule, fibre, shred, crumb, chip, flake, or a pebble, of any suitable size or color.

The conductive particles 10 further comprise conductive material which can be, for example, a metal, a metal oxide, a metal alloy, carbon, or a mixture thereof. The conductive material may have high conductive properties; however to fulfil specific requirements, for example aesthetical requirements, for example to get a certain transparency, a less conductive material may be used.

Preferably, the conductive particles comprise silver, nickel, tungsten, aluminium, copper, gold, stainless steel, titanium, titanium dioxide, tin, tin oxides, tin dioxide, antimony, antimony oxides, antimony-pentoxide, carbon black, carbon graphite, carbon nanotubes, or a mixture thereof.

The conductive material represent between 1% wt and 40% wt of the weight of a conductive particle.

The conductive particles 10 have any suitable shape, size and thickness to form a network to conduct electric charges from the top surface to the lower surface of the surface covering. The conductive particles 10 have a size between around 1 and around 3 mm and an electrical resistance between around 0.01 and around 100 Mohms.

The conductive particles 10 represent less than 50 wt % of the total weight of the surface covering.

Preferably, the non-conductive particles 11 are made from a sheet of a composition comprising a polymer, PVC-based polymer, or polyolefin-based polymer, which is manufactured before being granulated, or shredded, into said non-conductive particles. Preferably, the sheet is manufactured by calendering from a continuous polymer stream coming from an extruder device.

Preferably, the conductive particles 10 are made from a sheet of a composition comprising a conductive material and a PVC based polymer or a polyolefin based polymer. The conductive material, having the form of a powder or a fibre, is incorporated into the polymer particles by an extruder device followed be a calender.

The non-conductive 11 or conductive particles may further comprise a filler, a stabilizer, a pigment, or a mixture thereof. A PVC-based composition may further comprise a plasticizer.

Preferably, the filler represents between 0 and 200 Phr, the stabilizer between 0.5 and 5 Phr, the pigment between 0 and 10 Phr, the plasticizer between 10 and 60 Phr, the unit "Phr" meaning "proportion by weight", with respect to 100 parts of the polymer (PVC or polyolefin).

Typical non-conductive particles (NCP) or conductive particles (CP) compositions are given in tables 1 and 2.

TABLE 1

Compositions for PVC-based non-conductive particles (NCP) or conductive particles (CP).

| | NCP-1 in Phr | NCP-2 in Phr | NCP-3 in Phr | CP-1 In Phr | CP-2 In Phr |
|---|---|---|---|---|---|
| PVC | 100 | 100 | 100 | 100 | 100 |
| Plasticizer | 40 | 30 | 50 | 40 | 30 |
| Stabilizer | 3 | 2 | 4 | 3 | 3 |
| Fillers | 60 | 20 | 150 | 50 | 30 |

TABLE 1-continued

Compositions for PVC-based non-conductive particles (NCP) or conductive particles (CP).

|  | NCP-1 in Phr | NCP-2 in Phr | NCP-3 in Phr | CP-1 In Phr | CP-2 In Phr |
|---|---|---|---|---|---|
| Pigment | 4 | 1 | 7 | 0 | 0 |
| Conductive material | 0 | 0 | 0 | 10 | 20 |

TABLE 2

Compositions for polyolefin-based non-conductive particles (NCP) and conductive particles (CP).

|  | NCP-A in Phr | NCP-B in Phr | NCP-C in Phr | CP-D in Phr |
|---|---|---|---|---|
| Polyolefin | 100 | 100 | 100 | 100 |
| Stabilizer | 2 | 1 | 1 | 1 |
| Fillers | 50 | 0 | 150 | 50 |
| Pigment | 4 | 5 | 3 | 0 |
| Conductive material | 0 | 0 | 0 | 20 |

As an example, the PVC polymer is the one from Hydro Polymers, Ineos, Georgia Gulf or Solvin. Preferably, the polyolefin polymer is polyethylene or polyethylene co-octene (PE-co-O), for example Affinity™ EG 8100 from Dow Chemical.

The filler is any suitable filler. Preferably, it is selected among hydrates, oxides, clays, carbonates, dolomite or talc or a mixture thereof. As an example, the filler is dolomite (Myanite A20) from Omya AB, chalk as Danchalk® P from Dankalk or as Reosorb 90 from Omya AB.

The stabilizer is any suitable stabilizer. Preferably, it is a Ca—Zn stabilizer, for example the Ca—Zn stabilizer from Akcros or from Bärlocher GmbH.

The pigment is any suitable pigment only limited to aesthetic considerations. Preferably, it is titanium oxide, C.I. Red 144, C.I. Blue 15:1, C.I. Black 7, C.I. Green 7, C.I. Yellow 83 or C.I. Violet 23. For example, titanium dioxide is Kemira 660 from Kemira Pigments, Tiona® 168 from Millenium Chemicals or Tronox® R-FK-3 from IMCD Sweden AB, the Blue 15:1 is Irgatith Blue BCA from Ciba or the PV Fast Blue from Clariant, the C.I. Red 144 is Cromophtal® Red BRNP from Ciba, and C.I. Black 7 is Printex® U from Evonik.

The plasticizer is any suitable plasticizer. Preferably it is DINP (Di-isononylphtalate) or DIDP (Di-isodecylphtalate), for example from Exxon Mobile or Oxeno GmbH.

For conductive particles, the conductive material is preferably carbon black, carbon nanotubes, or electroconductive titanium dioxide in the form of a powder or a fibre, as for example as described in U.S. Pat. No. 4,373,013, or as known as Zelec® ECP from Milliken.

The polymer matrix 12, wherein the non-conductive particles 11 and the conductive particles 10 are embedded, is a PVC-based or a polyolefin-based composition. A preferred polyolefin is polyethylene or a co-polymer thereof.

The polymer matrix 12 is made from a powder comprising a particle size lower than the one of the conductive particles. Preferably, the particle size of said powder is between 1 and 300 μm.

The polymer matrix 12 represents less than 50% wt of the total weight of the composition of the surface covering 9.

The polymer matrix composition may, or may not, comprise at least one conductive material improving the electrical conductivity of said surface covering.

The conductive material is any suitable material of any suitable shape, size or form, for example it may be in the form of a powder or a fiber. It may be the same material as the conductive material of the conductive particles. It may represent between 1 and 40 Phr.

In the form of a fibre, the conductive material has a diameter between 0.01 and 1 μm, preferably around 0.3 μm, and a length between 0.05 and 10 μm, preferably around 5.15 μm.

The polymer matrix composition may further comprise a plasticizer, a stabilizer or a mixture thereof.

The stabilizer may preferably represent between 0.5 and 5 Phr. For a PVC-based composition, the plasticizer may preferably represent between 5 and 50 Phr.

Typical polymer matrix compositions are given in tables 3 and 4.

TABLE 3

PVC-based polymer matrix powder compositions

|  | Powder 1 in Phr | Powder 2 in Phr | Powder 3 in Phr | Powder 4 in Phr | Powder 5 in Phr |
|---|---|---|---|---|---|
| PVC | 100 | 100 | 100 | 100 | 100 |
| Plasticizer | 35 | 40 | 40 | 5 | 50 |
| Stabilizer | 2.5 | 2 | 2 | 1 | 3 |
| Conductive material | 13 | 20 | 5 | 40 | 15 |
| Pigment | 0 | 0 | 1 | 1 | 0 |

TABLE 4

Polyolefin-based polymer matrix powder compositions

|  | Powder A in Phr | Powder B in Phr | Powder C in Phr |
|---|---|---|---|
| Polyolefin | 100 | 100 | 100 |
| Stabilizer | 2 | 2 | 1 |
| Conductive material | 5 | 15 | 30 |
| Pigment | 0 | 1 | 0 |

As an example, the PVC polymer is the one from Hydro Polymers, Ineos, Georgia Gulf or Solvin. Preferably, the polyolefin polymer is polyethylene or polyethylene co-octene (PE-co-O), for example Affinity™ EG 8100 from Dow Chemical.

The stabilizer is any suitable stabilizer. Preferably, it is a Ca—Zn stabilizer, for example the Ca—Zn stabilizer from Akcros or from Bärlocher GmbH.

The pigment is any suitable pigment only limited to aesthetic considerations. Preferably, it is titanium dioxide, C.I. Red 144, C.I. Blue 15:1, C.I. Black 7, C.I. Green 7, C.I. Yellow 83 or C.I. Violet 23. For example, titan oxide is Kemira 660 from Kemira Pigments, Tiona® 168 from Millenium Chemicals or Tronox® R-FK-3 from IMCD Sweden AB, the Blue 15:1 is Irgatith Blue BCA from Ciba or the PV Fast Blue from Clariant, the C.I. Red 144 is Cromophtal® Red BRNP from Ciba, and C.I. Black 7 is Printex® U from Evonik.

The plasticizer is any suitable plasticizer. Preferably it is DINP (Di-isononylphtalate) or DIDP (Di-isodecylphtalate), for example from Exxon Mobile or Oxeno GmbH.

Preferably, the conductive material is electroconductive titanium dioxide in the form of a powder or a fibre, as for example as described in U.S. Pat. No. 4,373,013, or as known as Zelec® ECP from Milliken.

In a first embodiment, the substrate-free surface covering comprises conductive particles 10 and non-conductive particles 11 embedded in a polymer matrix 12, said matrix does not comprise conductive material improving the electrical conductivity of said surface covering.

In a second embodiment, the surface covering comprises only conductive particles 10 embedded in a polymer matrix 12 which does not comprise conductive material improving the electrical conductivity of said surface covering.

In a third embodiment, the surface covering comprises conductive particles 10 and non-conductive particles 11 embedded in a polymer matrix 12 comprising conductive material improving the electrical conductivity of said surface covering.

In a fourth embodiment, the surface covering comprises non-conductive particles 11 embedded in a polymer matrix 12 comprising conductive material improving the electrical conductivity of said surface covering.

In a fifth embodiment, the surface covering comprises only conductive particles 10 embedded in a polymer matrix 12 comprising conductive material which improving the electrical conductivity of said surface covering.

Figure 2:
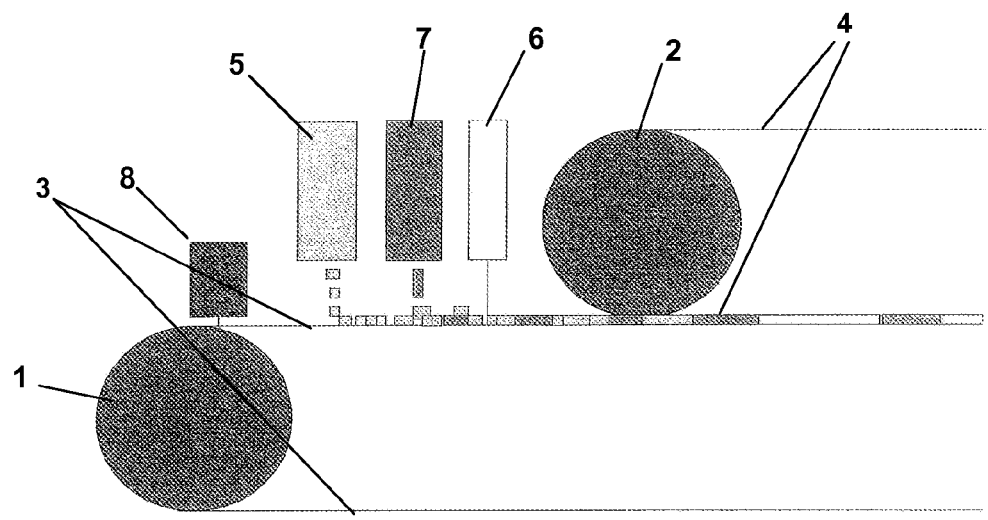
FIG. 2 is a schematic representation of a double belt press device to manufacture a substrate-free surface covering according to a second embodiment of the invention.
Figure 3:
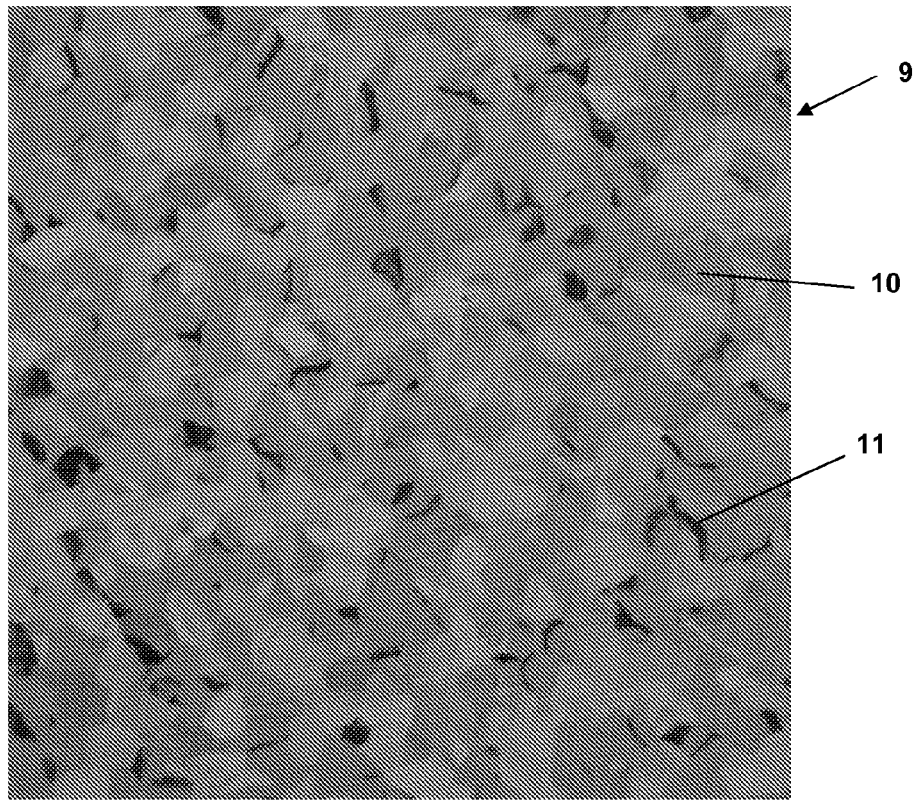
FIG. 3 represents a surface covering with static control properties.
Figure 4:
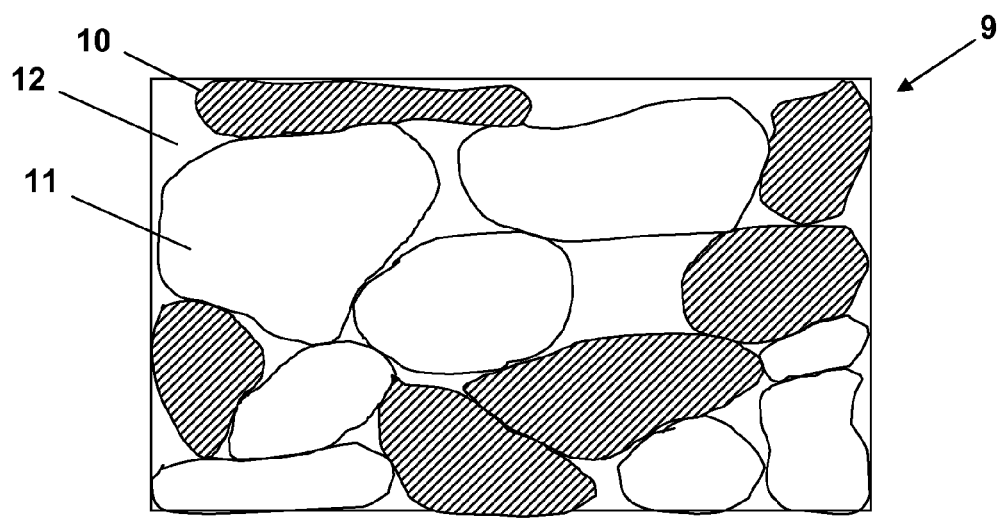
FIG. 4 is a schematic representation of a cross-section view of a surface covering comprising conductive and non-conductive particles embedded in the polymer matrix.
Figure 5:
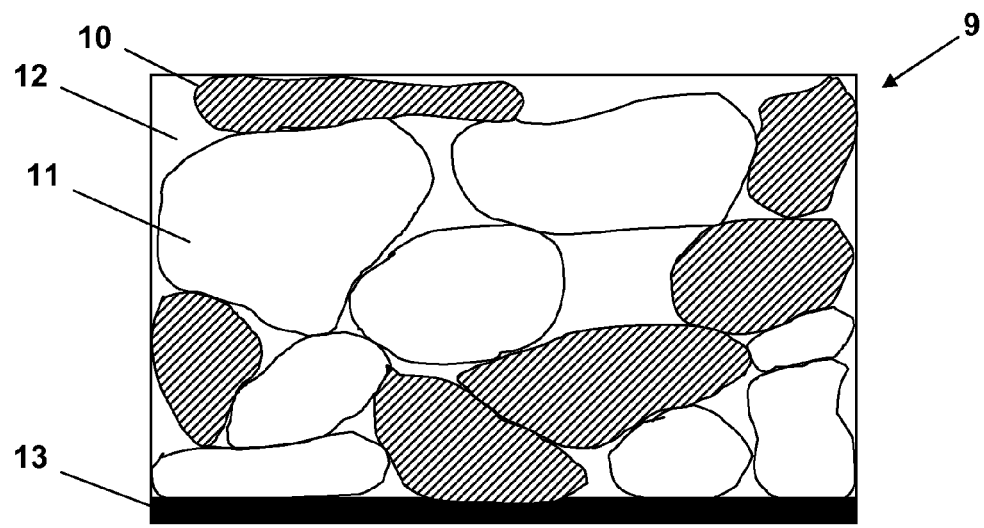
FIG. 5 is a schematic representation of a cross-section view of a surface covering comprising conductive and non-conductive particles embedded in the conductive polymer matrix, and comprising a back side conductive coating.
Figure 6:
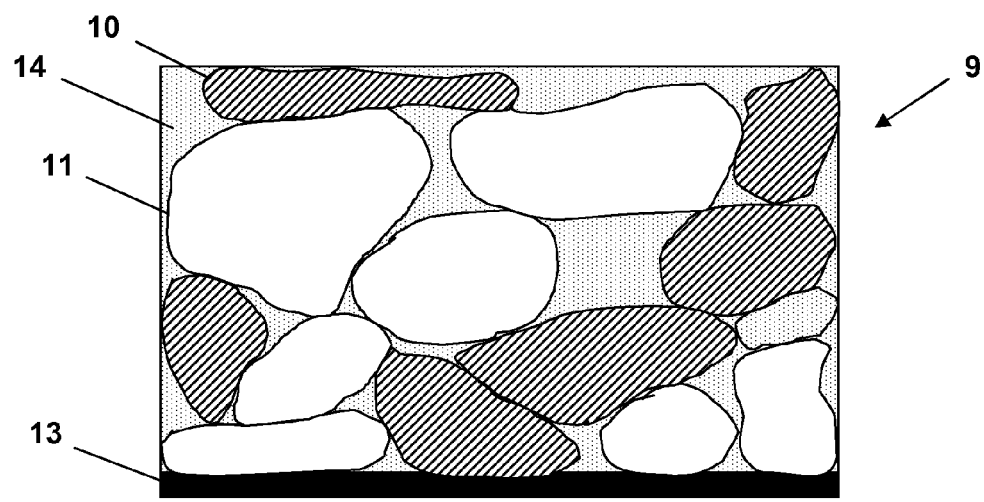
FIG. 6 is a schematic representation of a cross-section view of a surface covering comprising conductive and non-conductive particles embedded in a conductive polymer matrix, and comprising a back side conductive coating.
Figure 7:
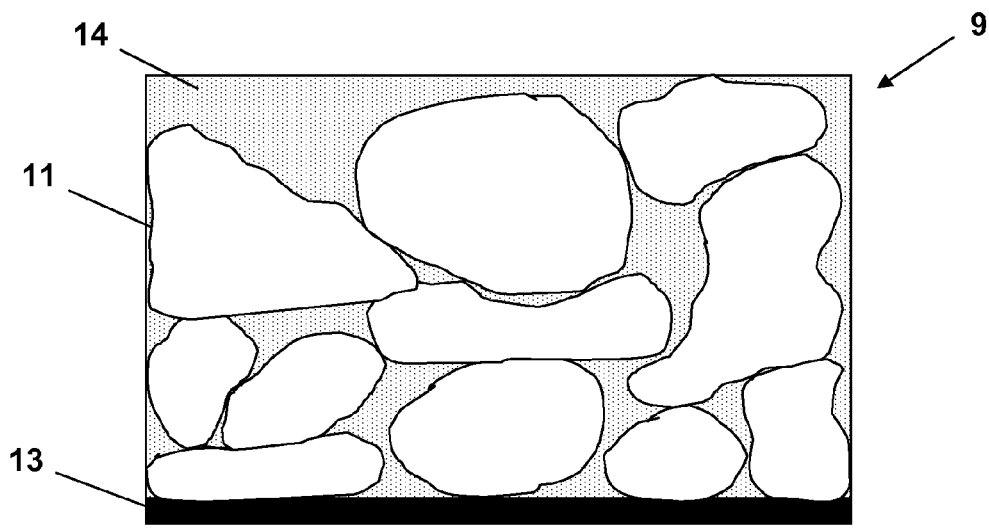
FIG. 7 is a schematic representation of a cross-section view of a surface covering comprising non-conductive particles embedded in the conductive polymer matrix, and comprising a back side conductive coating.
Figure 8:
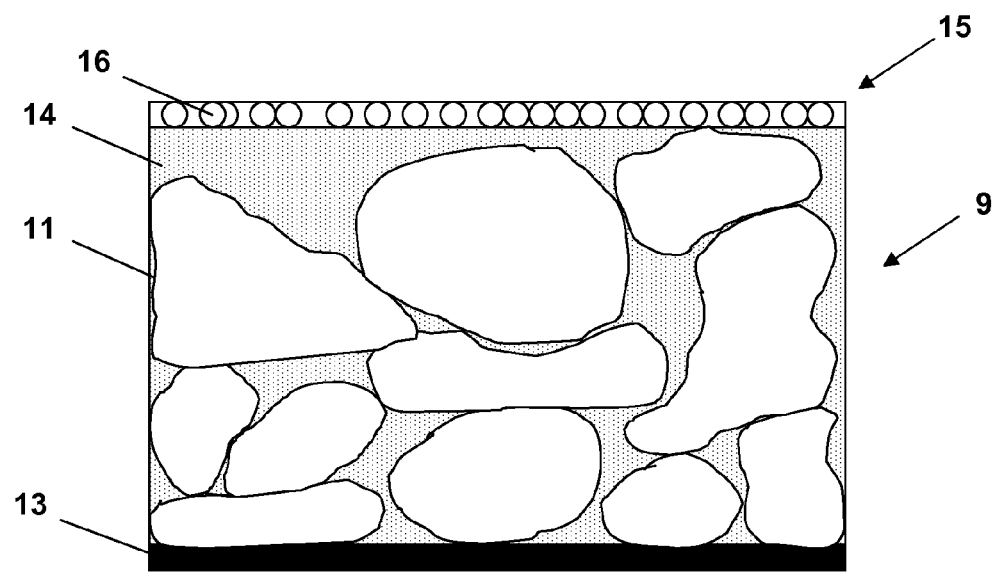
FIG. 8 is a schematic representation of a cross-section view of a surface covering comprising non-conductive particles embedded in a conductive polymer matrix, and comprising a back side conductive coating and a top side conductive varnish.
Figure 9:
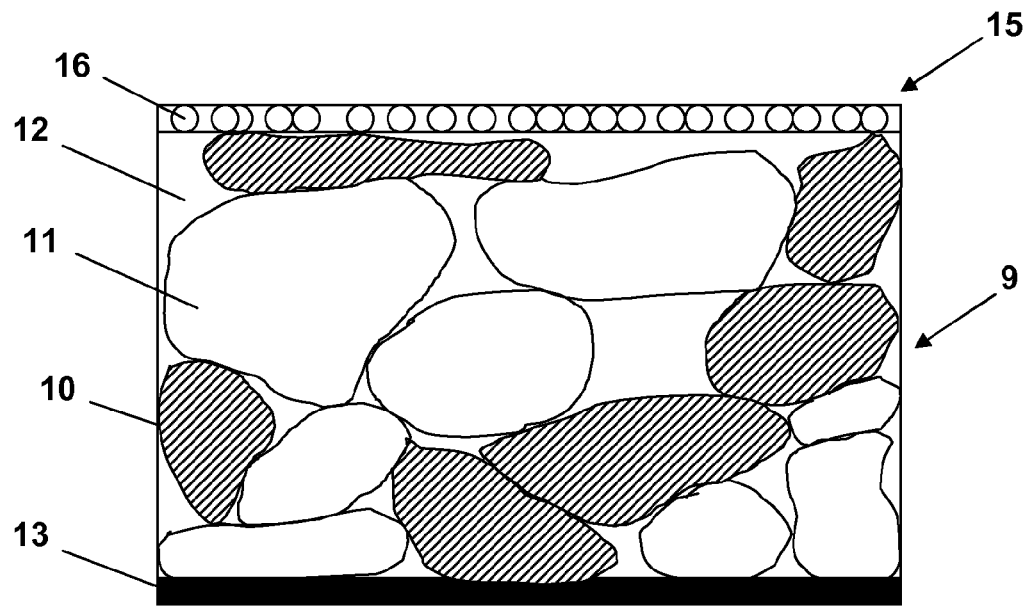
FIG. 9 is a schematic representation of a cross-section view of a surface covering comprising conductive and non-conductive particles embedded in a polymer matrix, and a back side conductive coating and a top side conductive varnish.
Figure 10:
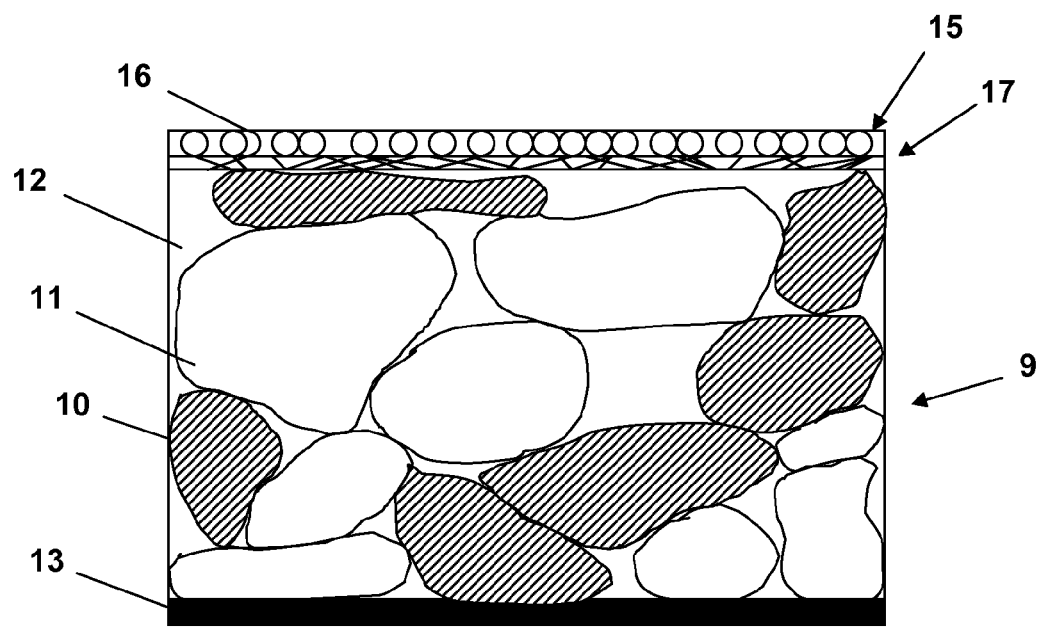
FIG. 10 is a schematic representation of a cross-section view of a surface covering comprising conductive and non-conductive particles embedded in a polymer matrix, and comprising a back side conductive coating, a top side conductive varnish applied over a top coating conductive primer.

The substrate-free surface covering according to the invention is produced using any suitable device. Preferably, as shown in FIGS. 1 and 2, it is produced using a double belt press comprising a band-shaped moving carrier 3 (or lower belt) made of steel or comprising a release paper for example, a roller 1 moving the lower belt 3, a roller 2 moving a upper belt 4, said roller 2 being heated and operating at a temperature between 160 and 200° C. and a pressure of between 0.5 and 25 bars.

To manufacture the substrate-free surface covering according to the present invention, no bottom layer, or substrate, is used. The conductive particles 10 and the non-conductive particles 11 are scattered onto the band-shaped moving carrier 3, in a quantity of between 1 and 5 Kg/m$^2$ using either one of the device 5 or device 7 (FIG. 1) fed with a mixture of non-conductive and conductive particles, or using the device 5 feed with conductive particles and the device 7 (FIG. 2) feed with non-conductive particles.

Preferably, the devices 5 or 7 are fed, and thus deposit, only the particles of the desired size. To achieve this, during the manufacturing process of the particles, the particles may pass through a grid, for example a 10 mm grid placed in a granulator, to select the particles of the desired size.

The deposition of the polymer matrix powder is performed by a device 6 which scatters the powder onto the moving carrier 3 and the conductive particles 10 and/or non-conductive particles 11, in a quantity of between 0.01 to 0.30 Kg/m$^2$.

The particles and the polymer matrix powder are then heated and compacted in a double belt press for example, to form the substrate-free surface covering. Thus, the conductive material of a conductive particle is brought into contact with the conductive material of another conductive particle to form conductive or dissipative channels. In the same manner, the conductive material of the polymer matrix composition is brought into contact with another conductive material within the polymer matrix, or is brought in contact with the conductive material of the conductive particles, to form conductive or dissipative channels.

The back side of the resulting substrate-free surface covering is sanded to adjust the thickness of the surface covering to a defined value. Preferably, around 0.2 mm of the back is removed, the final thickness of the surface covering being between 1.9 and 2.2 mm.

To produce the substrate-free conductive surface covering according to the present invention, no bottom layer, or substrate, is used. However, before depositing the particles onto the moving carrier, the dust 11 produced by the sanding step is deposited onto the band shaped moving carrier 3 to form a bed of around 0.2 to 3 mm. Preferably, the dust 11 represents less than 10% of the total weight of the surface covering. Preferably, the sanding dust is deposited using the device 8.

The back side of the resulting substrate-free surface covering, which was sanded or not, is coated with a back side conductive coating 13 comprising conductive material improving the electrical conductivity of the surface covering. The conductive material is any suitable material. It may be, for example, the same material as the conductive material of the conductive particles 10 or the polymer matrix 12, and may represent between 10 and 100 Phr.

The back side conductive coating 13 is a polyurethane-base coating, preferably it comprises a PU-dispersion or a PU-solution of a two-component PU, a PU acrylate, an epoxy acrylate, a polyester acrylate, a polyether acrylate, a silicone acrylate, or a mixture thereof. Preferably, the back side coating comprises a water-based UV-curable PU acrylate dispersion with a dry content of between 5% and 80% wt, preferably between 20 and 60% wt.

The back side conductive coating 13 is applied by any suitable means, for example at around 20 g/m$^2$. Preferably, this back side coating 13 has a thickness of about 6 μm.

Preferably, the top side of the substrate-free surface covering, with or without embossment, is coated with a conductive varnish layer 15, preferably a polyurethane-based layer, comprising conductive spherical particles 16.

Preferably, the varnish layer 15 has a thickness of around 10 μm and is applied by any suitable technique, for example roller coating, reverse and inverse spraying, curtain, screen.

The top coating 15 comprises a PU-dispersion or a PU-solution of a two-component PU, a PU acrylate, an epoxy acrylate, a polyester acrylate, a polyether acrylate, a silicone acrylate, or a mixture thereof. Preferably, the top coating comprises a water-based UV-curable PU acrylate dispersion with a dry content of between 5% and 80% wt, preferably between 20 and 60% wt.

The top coating 15 comprises metal coated spherical particles 16 having a dry bulk resistivity between 0.0001 and 0.01 ohms/cm. The spherical particles 16 are of any suitable material, however glass particles are preferred. Preferably, they have a particle size between 1 to 100 μm. Preferably, They represent between 0.01 and 10% wt of the total weight of the top coating. However, their concentration in the top coating composition and their size may be adapted to fit with the thickness of the top coating desired.

The spherical particles 16 may be coated with any suitable metal, but preferably they are coated with silver, aluminium, copper, nickel, gold or an alloy thereof with another metal.

In a preferred embodiment, before applying the varnish layer 15, the top side of the surface covering is coated with a top coating conductive primer 17. This primer allows to connect the spherical particles in the top coating 15 with the conductive channels made by the conductive material of the conductive particles 10 and/or the conductive material of the polymer matrix 12, thus improving the conductive properties of the surface covering.

The top coating conductive primer 17 comprises conductive material. The conductive material is any suitable material. It may be, for example, the same material as the conductive material of the conductive particles or the polymer matrix, and may represent between 1 and 10000 Phr. Preferably, it is electroconductive tin oxide such as described in JP56120519, more preferably, it is an acicular type electroconductive tin oxide composition comprising tin oxide and antimony pentoxide.

The top coating conductive primer 17 is preferably a polyurethane-base coating, preferably it comprises a PU-dispersion or a PU-solution of a two-component PU, a PU acrylate, an epoxy acrylate, a polyester acrylate, a polyether acrylate, a silicone acrylate, or a mixture thereof.

Preferably, the top coating conductive primer comprises a water-based UV-curable PU acrylate dispersion with a dry content of between 1% and 40% wt, preferably between 3 and 25% wt.

Preferably, the thickness of the top coating conductive primer 17 is around 2 μm and may be applied by any suitable technique.

The top coating conductive primer 17 may be substantially transparent or translucent.

The use of the top coating conductive primer 17 in combination with the top coating gives to substrate-free surface covering not only enhanced static control properties but also excellent cleaning and maintenance properties.

According to ANSI/ESD S7.1 standard, a surface covering having a resistance to ground less then $1\times10^6$ ohms is considered as a "conductive" covering, and a surface covering having a resistance to ground less then $1\times10^9$ ohms is considered as a "dissipative" covering. Furthermore, it generally admitted that an "anti-static" surface covering have a resistance to ground between $1\times10^{10}$ to $1\times10^{12}$ ohms, and that above $1\times10^{12}$ ohms, the surface covering is considered as "insulator".

The substrate-free surface covering according to the invention are at least anti-static coverings, but in majority, they are either dissipative or conductive coverings as their conductive resistance are between 0.02 MΩ and 27 MΩ, and a surface resistance between 0.07 MΩ and 102 MΩ.

EXAMPLES

Example 1

A substrate-free surface covering is manufactured using PVC-based non-conductive particles comprising 48% wt PVC polymer from Hydro Polymers, 19% wt DINP (di-isononylphtalate) from Exxon Mobile as plasticizer, 2% wt of CaZn stabilizer from Akcros, 20% wt dolomite (Myanite A20) from Omya AB and 9% wt chalk (Danchalk® P) from Dankalk as fillers, and as pigments 1.9% wt of titanium dioxide (Kemira 660) from Kemira Pigments and 0.1% wt of C.I. Blue 15:1 (Irgatith Blue BCA) from Ciba. The non-conductive particles are deposited using a device 5 (feed station), at a quantity of 3.6 Kg/m$^2$, onto a lower steel belt of 2.5 meters wide and running at a speed of 10 meters/min to form a bed of around 3 mm. On a subsequent feeding station 6, the PVC-based polymer matrix powder, comprising 66 wt % of PVC from Hydro Polymers, Ineos, 22 wt % of DINP (di-isononylphtalate) from Exxon Mobile as plasticizer and 2% wt of CaZn stabilizer from Akcros Chemical, and 10% wt of acicular type electroconductive titanium dioxide from Union Chemical as conductive material, is scattered onto the non-conductive particles in a quantity of 60 g/m$^2$. The non-conductive particles and the polymer matrix powder are pressed at around 10 bars between the lower steel belt and the upper steel belt which is heated up to around 175° C. on a distance of around 7 meters. After this heating process, the sheet produced is cooled down to about 30° C. in the double-belt press. The back side is sanded to remove around 0.2 mm so that the thickness of the surface covering is around 2 mm. The back side is then coated with the back side conductive coating (20 g/m$^2$) comprising 15% wt of carbon black.

Example 2

Example 2 is performed in the same way than example 1, except the fact that the polymer matrix powder containing the conductive material is scattered onto the non-conductive particles in a quantity of 90 g/m$^2$.

Example 3

Example 2 is performed in the same way than example 1, except the fact that the polymer matrix powder containing the conductive material is scattered onto the non-conductive particles in a quantity of 120 g/m$^2$.

Example 4

Example 4 is performed in the same way than example 2 except the fact that the substrate-free covering further comprises a top coating (20 g/m$^2$ wet) comprising spherical particles coated with silver as conductive material.

Example 5

Example 5 is performed in the same way than example 1 except the fact that a polyurethane-base top coating conductive primer, comprising 40% wt of a water-based acicular tin oxide composition, comprising around 20% wt of tin oxide and around 0.7% wt of antimony pentoxide, is applied (12 g/m$^2$ wet) before applying the top coating (20 g/m$^2$ wet) comprising spherical particles coated with silver.

Example 6

Example 6 is performed in the same way than example 4 except the fact that a polyurethane-base top coating conductive primer, comprising 40% wt of a water-based acicular tin oxide composition comprising around 20% wt of tin oxide and around 0.7% wt of antimony pentoxide, is applied (12 g/m$^2$ wet) before applying the top coating comprising spherical particles coated with silver.

Example 7

Example 7 is performed in the same way than example 1, except the fact that the polymer matrix powder comprises 13% wt of the electroconductive titanium dioxide as conductive material, and in that the powder is scattered onto the conductive particles in a quantity of 30 g/m$^2$.

Example 8

Example 8 is performed in the same way than example 7, except the fact that the polymer matrix powder containing the conductive material is scattered onto the conductive particles in a quantity of 60 g/m$^2$.

Example 9

Example 9 is performed in the same way than example 7, except the fact that the polymer matrix powder containing the conductive material is scattered onto the conductive particles in a quantity of 90 g/m².

Example 10

Example 10 is performed in the same way than example 7, except the fact that the polymer matrix powder containing the conductive material is scattered onto the conductive particles in a quantity of 120 g/m².

Example 11

Example 11 is performed in the same way than example 9, except the fact that the substrate-free covering further comprises a top coating (20 g/m² wet) comprising silver coated spherical particles as conductive material.

Example 12

Example 12 is performed in the same way than example 11, except the fact that a water-based top coating conductive primer comprising 40% wt of a water-based acicular tin oxide composition, comprising around 20% wt of tin oxide and around 0.7% wt of antimony pentoxide, is applied (12 g/m² wet) before applying the top coating (20 g/m² wet) comprising silver coated spherical particles.

Example 13

A substrate-free surface covering is manufactured using PVC-based non-conductive particles as described in example 1, and PVC-based conductive particles comprising 35% wt PVC polymer from Hydro Polymers, 13% wt of carbon black, 19% wt DINP (di-isononylphtalate) from Exxon Mobile as plasticizer, 2% wt of CaZn stabilizer from Akcros, 20% wt dolomite (Myanite A20) from Omya AB and 9% wt chalk (Danchalk P) from Dankalk® as fillers, and as pigments 1.9% wt of titanium dioxide (Kemira 660) from Kemira Pigments and 0.1% wt of C.I. Blue 15:1 (Irgatith Blue BCA) from Ciba. The non-conductive particles and the conductive particles are deposited using a device 5 (feed station), at a quantity of 3.6 Kg/m², onto a lower steel belt of 2.5 meters wide and running at a speed of 10 meters/min to form a bed of around 3 mm. The conductive particles represent around 30% wt of the total weight of the mixture conductive and non-conductive particles. On a subsequent feeding station 6, the polymer matrix powder comprising 66 wt % of PVC from Hydro Polymers, 22 wt % of DINP (di-isononylphtalate) from Exxon Mobile as plasticizer, 2% wt of CaZn stabilizer from Akcros Chemical, 10% wt of acicular type electroconductive titanium dioxide from Union Chemical as conductive material, is scattered onto the conductive and non-conductive particles in a quantity of 120 g/m². The conductive and non-conductive particles and the polymer matrix powder are pressed at around 10 bars between the lower steel belt and the upper steel belt which is heated up to around 175° C. on a distance of around 7 meters. After this heating process, the sheet produced is cooled down to about 30° C. in the double-belt press. The back side is sanded to remove 0.2 mm so that the thickness of the surface covering is around 2 mm. The back side is then coated with the back side conductive coating (20 g/m²) comprising 15% wt of carbon black.

Example 14

Example 14 is performed in the same way than example 13, except the fact that the powder, applied onto the non-conductive and conductive particles, is a no conductive powder.

Example 15

Example 15 is performed in the same way than example 13, except the fact that a top coating (20 g/m²) comprising silver coated spherical particles as conductive material is applied on the top surface of the surface covering.

Example 16

Example 16 is performed in the same way than example 15, except the fact that a water-based top coating conductive primer, comprising 40% wt of a water-based acicular tin oxide composition, comprising around 20% wt of tin oxide and around 0.7% wt of antimony pentoxide, is applied (12 g/m² wet) before applying the top coating.

Example 17

Example 17 is performed in the same way than example 14, except the fact that a top coating (20 g/m² wet) comprising silver coated spherical particles as conductive material is applied on the top surface of the surface covering.

Example 18

Example 18 is performed in the same way than example 17, except the fact that a water-based top coating conductive primer, comprising 40% wt of a water-based acicular tin oxide composition, comprising around 20% wt of tin oxide and around 0.7% wt of antimony pentoxide, is applied (12 g/m² wet) before applying the top coating.

TABLE 5

Test results of the examples:

| Example n° | Conductive resistance, 50% RH MΩ | Surface resistance, 50% RH MΩ | Combination resistance, 50% RH | |
|---|---|---|---|---|
| | | | Shoe Nr 9 | Shoe Nr 10 |
| 1 | 240-5000 | 340-1490 | 88 | 210 |
| 2 | 9.7 | 16 | 10 | 120 |
| 3 | 1.4 | 3.4 | 1.2 | 12 |
| 4 | 5 | 12 | 5.5 | 75 |
| 5 | 3.3 | 8.3 | 2.1 | 6 |
| 6 | 0.8 | 2.1 | 0.6 | 4 |
| 7 | 3000 | 10000 | 375 | 1900 |
| 8 | 27 | 102 | 8 | 90 |
| 9 | 0.70 | 3.20 | 0.90 | 15 |
| 10 | 0.20 | 1.10 | 0.40 | 8 |
| 11 | 22 | 63 | 48 | 380 |
| 12 | 1 | 2 | 0.50 | 3.70 |
| 13 | 0.02 | 0.05 | 0.60 | 20 |
| 14 | 0.04 | 0.16 | 10 | 50 |
| 15 | 0.02 | 0.07 | 0.80 | 110 |

TABLE 5-continued

Test results of the examples:

| Example n° | Conductive resistance, 50% RH MΩ | Surface resistance, 50% RH MΩ | Combination resistance, 50% RH | |
|---|---|---|---|---|
| | | | Shoe Nr 9 | Shoe Nr 10 |
| 16 | 0.05 | 0.09 | 0.30 | 3 |
| 17 | 0.04 | 0.10 | 4 | 70 |
| 18 | 0.05 | 0.15 | 1 | 8 |

Keys:
1: roller
2: heated roller
3: moving carrier (lower belt)
4: upper belt
5: particles scattering device
6: polymer matrix powder scattering device
7: particles scattering device
8: sanding dust scattering device
9: substrate-free surface covering
10: conductive particles
11: non-conductive particles
12: polymer matrix
13: back side conductive coating
14: conductive polymer matrix
15: top side conductive varnish
16: spherical particles of the top side varnish
17: top coating conductive primer

The invention claimed is:

1. A substrate-free decorative conductive surface covering, comprising a front surface, a back surface and a core layer of particles of a shredded polymer sheet, said particles being unfused and embedded in a polymer matrix, wherein at least part of said particles are conductive particles comprising an electrically conductive material and being in contact to form in the polymer matrix conductive or dissipative channels for conducting electric charges from the front surface to the back surface of the surface covering; and wherein the polymer matrix is PVC-based or polyolefin-based.

2. The substrate-free decorative conductive surface covering according to claim 1, wherein the electrically conductive material is selected from the group consisting of metal, metal oxide, a metal alloy, carbon, or a mixture thereof.

3. The substrate-free decorative conductive surface covering according to claim 1, wherein the electrically conductive material is selected from the group consisting of silver, nickel, tungsten, aluminium, copper, gold, stainless steel, titanium, titanium dioxide, tin, tin oxide, antimony, antimony oxide, carbon black, carbon graphite, carbon nanotubes, or a mixture thereof.

4. The substrate-free decorative conductive surface covering according to claim 1, wherein the electrically conductive material is an acicular tin oxide composition.

5. The substrate-free decorative conductive surface covering according to claim 1, wherein the polymer matrix represents less than 50 wt % of the total weight of the composition of said substrate-free conductive surface covering.

6. The substrate-free decorative conductive surface covering according to claim 1, wherein the particles of the shredded polymer sheet are PVC-based or polyolefin-based.

7. The substrate-free decorative conductive surface covering according to claim 1, the core layer having a front side and a back side and having a conductive coating applied on the back side, the conductive coating comprising conductive material improving the electrical conductivity of the surface covering.

8. The substrate-free decorative conductive surface covering according to claim 1, having a conductive resistance less than $1 \cdot 10^{11}$ Ohm.

9. The substrate-free decorative conductive surface covering according to claim 1, having a conductive resistance of less than $1 \cdot 10^9$ Ohm.

10. A substrate-free decorative conductive floor covering having a front surface and a back surface and, comprising:
a core layer of polymer-sheet shreds, said shreds being unfused and embedded in a polymer matrix, wherein at least part of said polymer-sheet shreds are conductive polymer-sheet shreds comprising electrically conductive material and forming a network for conducting electric charges from the front surface to the back surface of the floor covering; and wherein the polymer matrix is PVC-based or polyolefin-based.

11. A substrate-free decorative conductive surface covering having a front surface and a back surface and comprising:
a core layer being formed of particles of a shredded polymer sheet, said particles being unfused and embedded in a polymer matrix, wherein at least part of said particles are conductive particles comprising an electrically conductive material and forming a network for conducting electric charges from a front side to a back side of the core layer, wherein the polymer matrix is PVC-based or polyolefin-based; and
a conductive coating applied on the back side of the core layer to form the back surface of the surface covering, the conductive coating comprising electrically conductive material improving the electrical conductivity of the surface covering.

12. The substrate-free decorative conductive surface covering as claimed in claim 11, wherein the front side of the core layer is covered by a polyurethane-based varnish forming the front surface of the surface covering, the varnish comprising metal coated spherical particles.

13. The substrate-free decorative conductive surface covering as claimed in claim 11, wherein the front side of the core layer is covered by a polyurethane-based varnish forming the front surface of the surface covering, and wherein a conductive primer layer is present between the polyurethane-based varnish top coating and the core layer of shredded sheet particles.

14. The substrate-free decorative conductive surface covering according to claim 11, wherein the electrically conductive material is selected from the group consisting of metal, metal oxide, a metal alloy, carbon, or a mixture thereof.

15. The substrate-free decorative conductive surface covering according to claim 11, wherein the electrically conductive material is selected from the group consisting of silver, nickel, tungsten, aluminium, copper, gold, stainless steel, titanium, titanium dioxide, tin, tin oxide, antimony, antimony oxide, carbon black, carbon graphite, carbon nanotubes, or a mixture thereof.

16. The substrate-free decorative conductive surface covering according to claim 11, wherein the electrically conductive material is an acicular tin oxide composition.

17. The substrate-free decorative conductive surface covering according to claim 11, wherein the polymer matrix represents less than 50 wt % of the total weight of the composition of the substrate-free conductive surface covering.

18. The substrate-free decorative conductive surface covering according to claim 11, wherein the particles of the shredded polymer sheet are PVC-based or polyolefin-based.

19. The substrate-free decorative conductive surface covering according to claim 11, having a conductive resistance less than $1 \cdot 10^{11}$ Ohm.

20. The substrate-free decorative conductive surface covering according to claim 11, having a conductive resistance of less than $1 \cdot 10^9$ Ohm.

21. The substrate-free decorative conductive surface covering as claimed in claim 1, wherein a front side of the core layer is covered by a polyurethane-based varnish forming the front surface of the surface covering, the varnish comprising metal coated spherical particles.

22. The substrate-free decorative conductive surface covering as claimed in claim 1, wherein a front side of the core layer is covered by a polyurethane-based varnish forming the front surface of the surface covering, and wherein a conductive primer layer is present between the polyurethane-based varnish top coating and the core layer of shredded sheet particles.

23. The substrate-free decorative conductive surface covering according to claim 1, wherein the conductive particles have a size between 1 mm and 3 mm.

24. The substrate-free decorative conductive surface covering according to claim 1, wherein the conductive particles represent less than 50 wt % the total weight of the composition of the substrate-free conductive surface covering.

25. A process to manufacture a substrate-free decorative conductive surface covering according to claim 1, said process comprising the steps of:
   a) providing particles obtained by shredding a polymer sheet,
   b) providing a polymer-based powder for the polymer matrix,
   c) depositing said particles of the shredded polymer sheet on a band-shaped moving carrier,
   d) depositing said polymer-based powder on said particles of the shredded polymer sheet,
   e) heat treating said particles of the shredded polymer sheet and said polymer-based powder and compacting them in a press to form agglomerated and unfused particles in the polymer matrix.

26. The process of claim 25, further comprising a step of sanding the back side surface of the resulting decorative conductive surface covering to a predefined thickness.

27. The process of claim 26, wherein dust generated in the back side sanding step is deposited on the band-shaped moving carrier before step c).

28. The process according to claim 25, further comprising a step of coating the back side of the decorative conductive surface covering with a conductive coating.

29. The process according to claim 25, further comprising a step of coating the top side of the decorative conductive surface covering with a polyurethane-based composition comprising metal coated spherical particles.

30. The process according to claim 29, wherein a conductive primer is applied onto the top surface of the decorative conductive surface covering before applying the polyurethane-based varnish.

* * * * *